United States Patent [19]
Okamoto

[11] Patent Number: 6,124,936
[45] Date of Patent: Sep. 26, 2000

[54] COLOR DISCRIMINATION SYSTEM

[75] Inventor: Yasuhiro Okamoto, Osaka, Japan

[73] Assignee: Keyence Corporation, Osaka, Japan

[21] Appl. No.: 09/337,754

[22] Filed: Jun. 22, 1999

[30] Foreign Application Priority Data

Oct. 15, 1998 [JP] Japan .................................. 10-294016

[51] Int. Cl.[7] ..................................................... G01J 3/51
[52] U.S. Cl. ........................... 356/406; 356/407; 356/425; 250/226
[58] Field of Search .................................. 356/402, 405, 356/406, 407, 425; 250/226

[56] References Cited

U.S. PATENT DOCUMENTS

| | | | |
|---|---|---|---|
| 4,350,441 | 9/1982 | Wicnienski | 356/40 |
| 4,402,611 | 9/1983 | Yuasa | 356/405 |
| 4,569,594 | 2/1986 | Cabi-Akman et al. | 356/408 |
| 4,653,014 | 3/1987 | Mikami et al. | 364/526 |
| 4,718,768 | 1/1988 | Houki et al. | 356/402 |
| 4,776,702 | 10/1988 | Yamaba | 356/425 |
| 4,813,000 | 3/1989 | Wyman et al. | 364/526 |
| 4,823,185 | 4/1989 | Miyamoto et al. | 358/29 |
| 4,834,541 | 5/1989 | Yamaba | 356/406 |
| 4,884,221 | 11/1989 | Sugiyama et al. | 364/526 |
| 4,886,366 | 12/1989 | Kogure | 356/406 |
| 5,033,857 | 7/1991 | Kubota et al. | 356/402 |
| 5,044,753 | 9/1991 | Fletcher | 356/402 |
| 5,363,197 | 11/1994 | Ohno et al. | 356/405 |
| 5,537,211 | 7/1996 | Dial | 356/402 |
| 5,537,212 | 7/1996 | Kelly et al. | 356/406 |
| 5,646,735 | 7/1997 | Krzyminski | 356/402 |
| 5,680,220 | 10/1997 | Delignieres et al. | 356/406 |
| 5,766,006 | 6/1998 | Murljacic | 433/26 |

*Primary Examiner*—F. L. Evans
*Attorney, Agent, or Firm*—Morgan, Lewis & Bockius LLP

[57] ABSTRACT

A color discrimination system which emits light from a light source to a measurement target, receives the light reflected from the measurement target or the light penetrating the measurement target by a light reception section for receiving the light for each of a plurality of light wavelengths, finding the sum total of the light reception quantities of the wavelengths and the ratios of the light reception quantities of the wavelengths to the sum total by an operation section, compares the values with reference values provided for a detection object, and discriminates color of the measurement target from color of the detection object based on the comparison result. The quantity of the light received by the light reception section for the detection object is sampled and the reference values are set to appropriate values, for example, in the range of the maximum value and the minimum value based on the sum total of the light reception quantities of the wavelengths and the ratios of the light reception quantities of the wavelengths to the sum total found by the operation section, whereby the optimum reference values responsive to the detection state and the detection environment can be set easily.

22 Claims, 4 Drawing Sheets

R RATIO DISPLAY

G RATIO DISPLAY

B RATIO DISPLAY

LIGHT RECEPTION QUANTITY DISPLAY

COLOR DISCRIMINATION SYSTEM

BACKGROUND OF THE INVENTION

1. Field of the Invention

This invention relates to a color discrimination system used for detecting an object according to color or for any other purpose.

2. Description of the Related Art

For example, a color discrimination system placed on an automatic transport line of a factory may be used to detect the presence or absence of an object moving on the line or detect a specific object by collating the color of the object moving on the line (measurement target) with the color given to a detection object. One known color discrimination system used for such a purpose is a system which emits light to a measurement target, receives the light reflected by the measurement target or the light penetrating the measurement target for each of different light wavelengths of, for example, red R, green G, and blue B, finds the sum total of the R, G, and B light reception quantities and the ratio of each of the R, G, and B light reception quantities to the sum total, and compares each ratio with the ratio of the light reception quantity for each wavelength preset for a detection object for finding a match degree therebetween, thereby detecting any desired object.

In such a color discrimination system, the range (determination tolerance) of the ratio of the light reception quantity for each wavelength preset as the comparison reference (or the light reception quantity for each wavelength) is set as the maximum value defined by trial and error and the resolution of the system. Generally, the reference value is set in a stable state in which the detection object is placed at a detection position.

In such a reference value setting, the reference value range of the ratio of the light reception quantity for each wavelength is narrow and it is expected that the discrimination capability is enhanced to cope with the narrow range, but the reference value is not easy to set and a malfunction easily occurs due to noise, disturbance light, etc. Since the reference value is set in a stable state, the measurement target needs also be measured in a similar stable state and the color of the moving measurement target can scarcely be discriminated. The recognition color of the color discrimination system used as the base for setting the reference value may be hard to determine because of the measurement environment, the measurement target, etc.

SUMMARY OF THE INVENTION

It is therefore an object of the invention to provide a color discrimination system for enabling easy setting of reference values, desired color discrimination with high accuracy, and color of a measurement target which is moving to be set as a reference value. It is another object of the invention to provide a color discrimination system capable of easily determining recognized color regardless of change in the measurement environment, the measurement object, etc.

According to a first aspect of the invention, there is provided a color discrimination system for receiving light reflected from a measurement target or light penetrating the measurement target for each of a plurality of light wavelengths, operating a sum total of light reception quantities of the wavelengths and ratios of the light reception quantities of the wavelengths to the sum total, comparing the found sum total and/or the operation values of the ratios with reference values of the sum total of the light reception quantities and/or the ratios of the light reception quantities of the wavelengths to the sum total for a detection object, and discriminating color of the measurement target and color of the detection object from each other based on the comparison result, wherein the reference values are set in a range of a maximum value and a minimum value of the sum total of the light reception quantities of the wavelengths and/or in a range of a maximum value and a minimum value of the ratios of the light reception quantities of the wavelengths to the sum total when the light reception quantities of the wavelengths for the detection object are found by sampling.

According to a second aspect of the invention, there is provided a color discrimination system for receiving light reflected from a measurement target or light penetrating the measurement target for each of a plurality of light wavelengths, operating a sum total of light reception quantities of the wavelengths and ratios of the light reception quantities of the wavelengths to the sum total, comparing the found sum total and/or the operation values of the ratios with reference values of the sum total of the light reception quantities and/or the ratios of the light reception quantities of the wavelengths to the sum total for a detection object, and discriminating color of the measurement target and color of the detection object from each other based on the comparison result, wherein the reference values are set based on sampling results of the light reception quantities at two points of the detection object different in color.

According to a third aspect of the invention, there is provided a color discrimination system for receiving light reflected from a measurement target or light penetrating the measurement target for each of a plurality of light wavelengths, operating a sum total of light reception quantities of the wavelengths and ratios of the light reception quantities of the wavelengths to the sum total, and adopting a specific one of the ratios found by the operation as recognized color, wherein the recognized color is based on the ratio when the sum total of the light reception quantities of the wavelengths for the measurement target by sampling exceeds a preset value of a light reception quantity required for color discrimination.

According to a fourth aspect of the invention, there is provided a color discrimination system for receiving light reflected from a measurement target or light penetrating the measurement target for each of a plurality of light wavelengths, operating a sum total of light reception quantities of the wavelengths and ratios of the light reception quantities of the wavelengths to the sum total, and adopting a specific one of the ratios found by the operation as recognized color, wherein when the light reception quantities for each wavelength at more than one point are sampled and found for a detection object, the recognized color is based on the maximum value of the ratios and other ratio when the maximum value is indicated or the sum total of the light reception quantities of the wavelengths when the maximum value is indicated together with the ratio.

According to a fifth aspect of the invention, there is provided a color discrimination system for receiving light reflected from a measurement target or light penetrating the measurement target for each of a plurality of light wavelengths, operating a sum total of light reception quantities of the wavelengths and ratios of the light reception quantities of the wavelengths to the sum total, comparing the found sum total and/or the operation values of the ratios with reference values of the sum total of the light reception quantities and/or the ratios of the light reception quantities of the wavelengths to the sum total for a detection object, and discriminating color of the measurement target and color of the detection object from each other based on the comparison result, wherein the light reception quantity for each wavelength is sampled and found for a detection object, the sum total of the light reception quantities of the wavelengths and the ratios of the light reception quantities of the wavelengths to the sum total found by the operation and/or the light reception quantities are displayed, and the reference values are set for each of the displayed ratios and/or light reception quantities.

In the invention, light is emitted to the detection object, the light reflected from the detection object or the light penetrating the detection object is received for each of a plurality of light wavelengths, the sum total of the light reception quantities of the wavelengths and the ratios of the light reception quantities of the wavelengths to the sum total are found, and the reference values concerning the color of the detection object are set based on the found results. Therefore, the reference values matching the actual purpose are provided independently of the characteristic of the amplifier, etc., of the system and can be set easily and the color discrimination accuracy can be enhanced.

If the light reception quantities for each wavelength are sampled at two points of the detection object different in color and the reference values of the ratios of the light reception quantities of the wavelengths to the sum total are in the range of the ratios of the light reception quantities of the wavelengths to the sum total at the two points and/or in the range of the light reception quantities of the wavelengths at the two points provided by the sampling, when the measurement target moves and starts to enter the detection area, it can be detected or the measurement target with color variations of red, red having a touch of white, etc., for example, depending on the print condition can also be detected.

If the recognized color of a specific one of the ratios of the light reception quantities of the wavelengths is based on the ratios of the light reception quantities of the wavelengths when the light reception quantity for each wavelength is sampled for the measurement target and the sum total of the light reception quantities of the wavelengths found by the operation exceeds the sum total of the light reception quantities required for the recognized color preset, even if the measurement target moves, it can be detected. Resultantly, color can be recognized regardless of the speed at which a workpiece moves on the manufacturing line, and the reference values as the threshold value of color discrimination can be set (tuned) easily.

Further, if the light reception quantity for each wavelength is sampled for the measurement target having points different in color and the recognized color of a specific one of the ratios of the light reception quantities of the wavelengths is based on the maximum value of the ratios of the light reception quantities of the wavelengths found by the operation and different ratio of the light reception quantity of the wavelength when the maximum value is indicated or the sum total of the light reception quantities of the wavelengths when the maximum value is indicated together with the ratio, either of the background color and the color of the measurement target can be recognized reliably. Resultantly, a moving object can be detected regardless of the moving speed and the reference values as the threshold value of color discrimination can be set (tuned) easily.

If display means for displaying the sum total of the light reception quantities of the wavelengths and the ratios of the light reception quantities of the wavelengths to the sum total found by the operation and/or the light reception quantities of the wavelengths is provided and the reference values of the ratios of the light reception quantities of the wavelengths to the sum total are set finely for the ratios of the light reception quantities of the wavelengths to the sum total while the display of the display means is seen, the discrimination accuracy can be furthermore enhanced in response to the situation.

DETAILED DESCRIPTION OF THE PREFERRED EMBODIMENT

Figure 1:
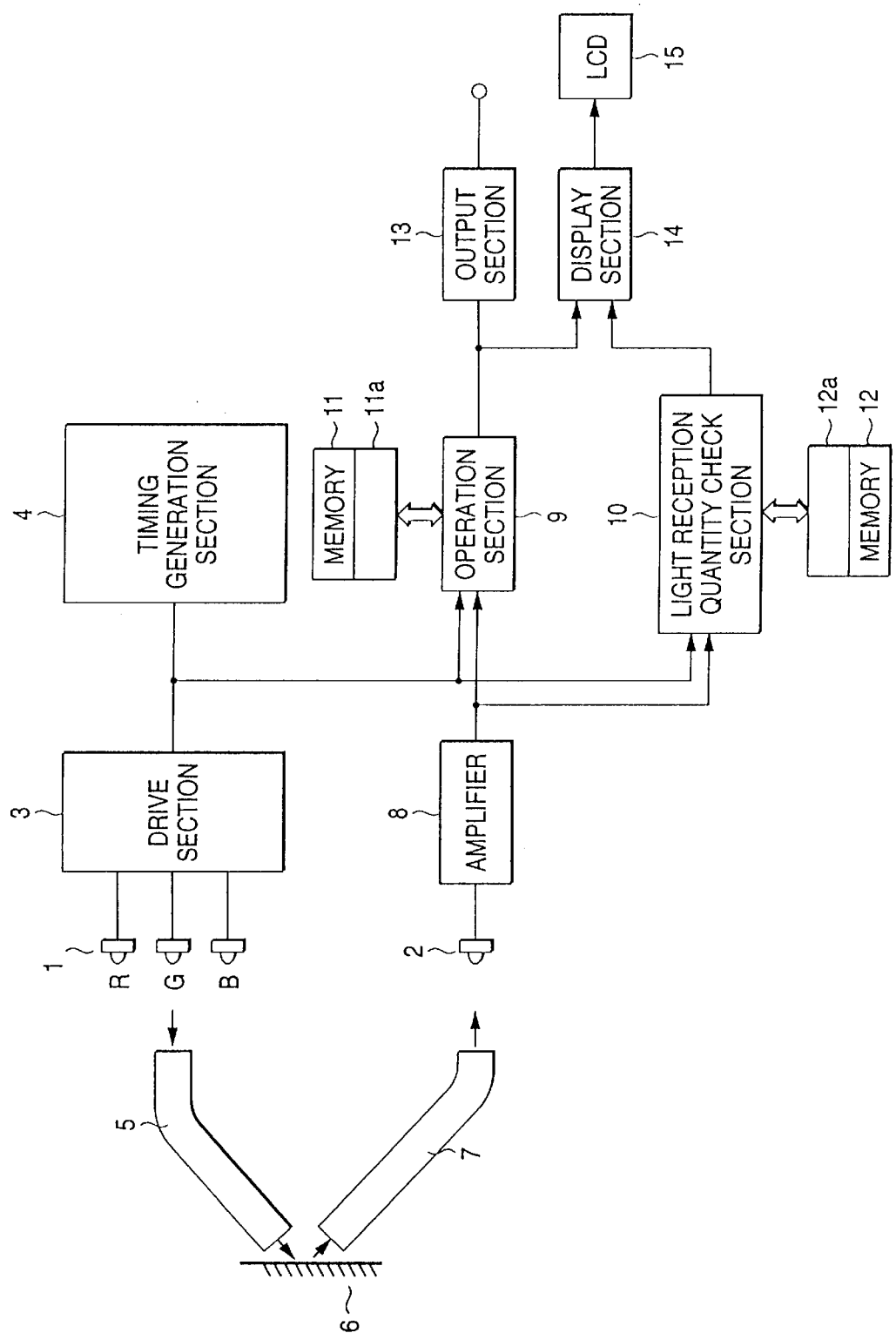
FIG. 1 is a block diagram to show a color discrimination system according to an embodiment of the invention.
Figure 2:
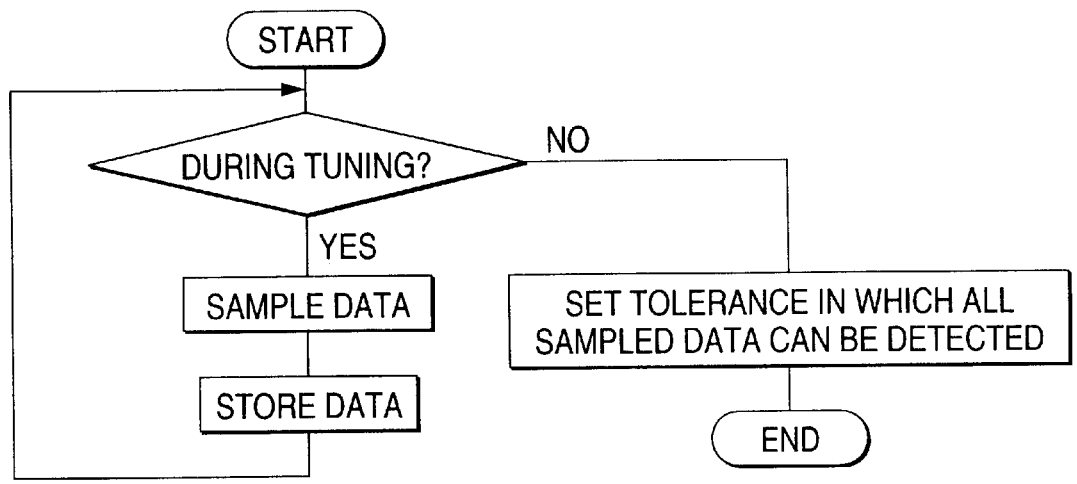
FIG. 2 is a flowchart to show the setting operation of an optimum sensitivity of the color discrimination system in FIG. 1.
Figure 3:
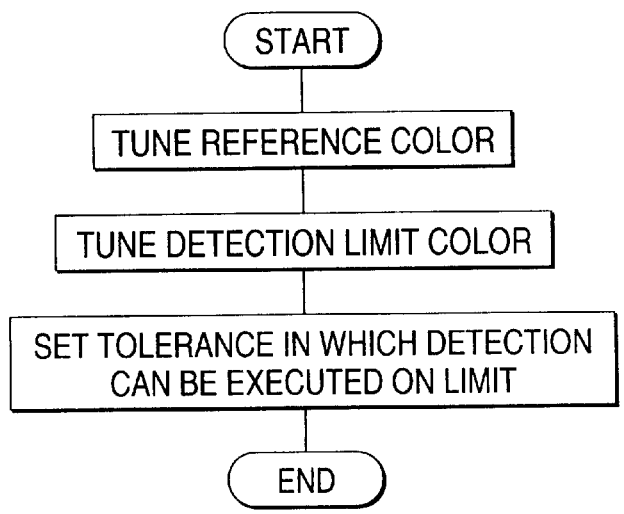
FIG. 3 is a flowchart to show the setting operation of a detection limit of the color discrimination system in FIG. 1.
Figure 4:
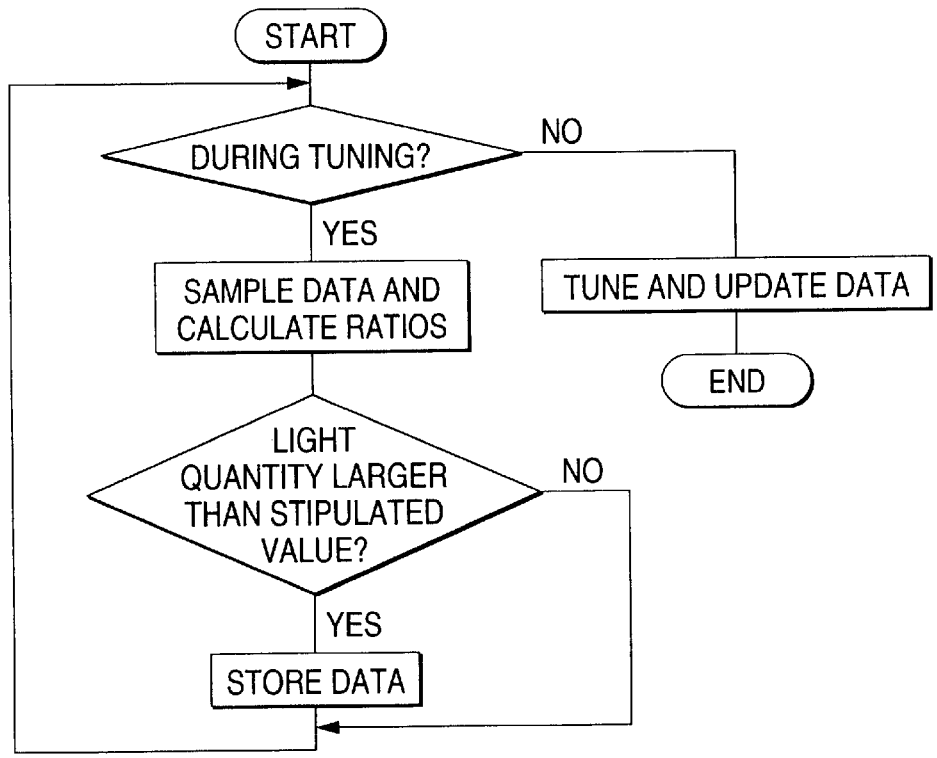
FIG. 4 is a flowchart to show the setting operation with a detection object passing through a detection area when no background exists, of the color discrimination system in FIG. 1.
Figure 5:
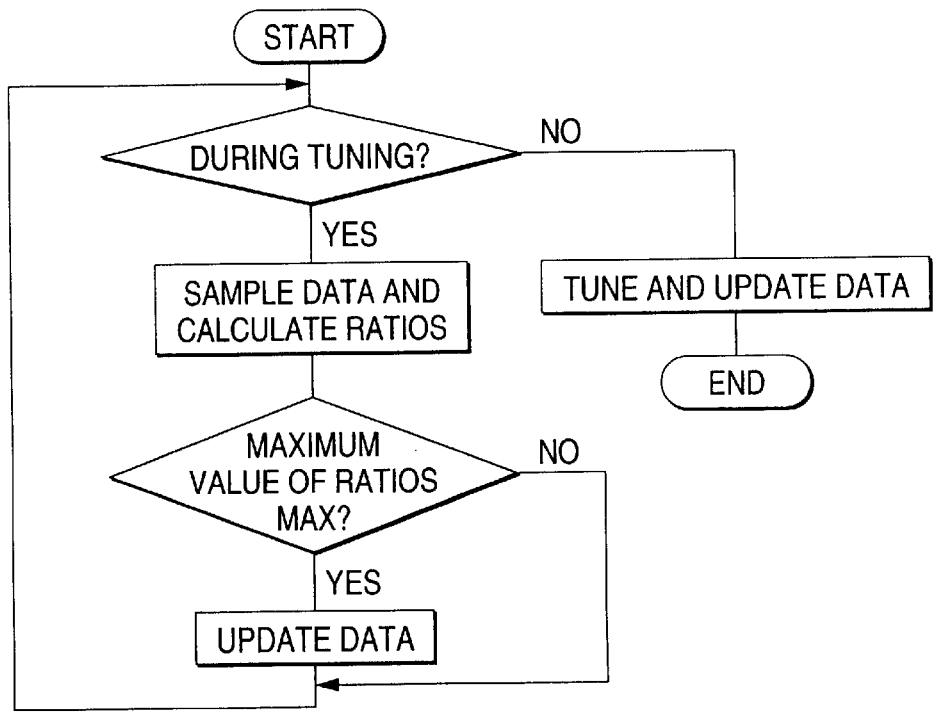
FIG. 5 is a flowchart to show the setting operation with a detection object passing through a detection area when a background exists, of the color discrimination system in FIG. 1.

Referring now to the accompanying drawings, there is shown a preferred embodiment of the invention. FIG. 1 is a block diagram to show a color discrimination system according to the embodiment of the invention. FIG. 2 is a flowchart to show the setting operation of an optimum sensitivity. FIG. 3 is a flowchart to show the setting operation of a detection limit. FIG. 4 is a flowchart to show the setting operation with a detection object passing through a detection area when no background exists. FIG. 5 is a flowchart to show the setting operation with a detection object passing through a detection area when a background exists. FIGS. 6(a) to 6(d) are drawings to show display examples.

In FIG. 1, reference numeral 1 denotes a light source; 2, a light reception element; 3, a light source drive section; 4, a timing generation section; 5, a light emission optical fiber; 6, a measurement target; 7, a light reception optical fiber; 8, an amplifier; 9, a operation section made up of a CPU (central processing unit), etc.; 10, a light reception quantity check section; 11 and 12, memories; 13, an output section; 14, a display section; and 15, a monitor section made up of an LCD (liquid crystal display), etc. Operation switches, etc., for operating the color discrimination system are not shown.

The light source 1 consists of a light emission element for emitting light R of red wavelength, a light emission element for emitting light G of green wavelength, and a light emission element for emitting light B of blue wavelength. The light emission elements are connected to the drive section 3 and emit light in order according to the timing from the timing generation section 4. The light from the light source 1 is emitted through the optical fiber 5 to the measurement target 6. Then, the light reflected on the measurement target 6 or the light penetrating the measurement target 6 is incident on the optical fiber 7 and the reflected light or the penetrating light sent therethrough is received at the light reception element 2.

The light reception element 2, which is made of one light reception element, receives R light, G light, and B light in order and outputs a signal responsive to the light reception quantity of each type of light. The output signal (light reception quantity) is input through the amplifier 8 to the operation section 9 and the light reception quantity check section 10.

A timing signal from the timing generation section 3 is input to the operation section 9 and is stored in the memory 11 for each of the color components R, G, and B of the light received at the light reception element 2. The memory 11 is provided with an area 11*a* for storing the reference value of the sum total of the light reception quantities of a detection object and the reference values for each of the color components R, G, and B. The reference value of the sum total of the light reception quantities of a detection object and the reference values for each of the color components R, G, and B (described later) are preset in the area 11*a*.

At the stage where the light reception quantities of the color components are input in a way, the operation section 9 finds the sum total (R+G+B=M) of the light reception quantities of the color components, finds the ratios (R/M, G/M, and B/M) of the light reception quantities of the color components to the found sum total M of the light reception quantities, repeats the operation each time the light reception quantities of the color components are input in a way, and compares the found sum total and the ratios (R/M, G/M, and B/M) of the light reception quantities of the color components to the sum total with the reference values set in the area 11*a*. If the operation section 9 determines the color of the measurement target 6 to be the color of the detection object, it sends the determination result to the output section 13 for output to a programmable controller, for example.

Figure 6:
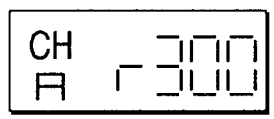
FIGS. 6(a) to 6(d) are drawings to show display examples of the color discrimination system in FIG. 1.
Figure 6:
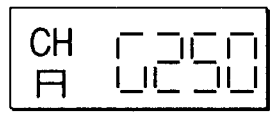
Figure 6:
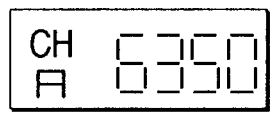
Figure 6:
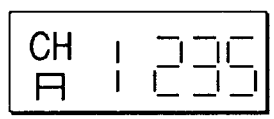

The operation section 9 also outputs the found sum total, the ratios of the light reception quantities of the color components to the sum total, the light reception quantities of the color components, and the reference values to the display section 14, which then displays the sum total and the ratios of the light reception quantities of the color components to the sum total sent from the operation section 9 on the monitor section 15 in three-digit numeric values provided by multiplying the ratios by 1000 (or as bar graph) as shown in FIGS. 6(*a*) to 6(*d*).

The timing signal from the timing generation section 3 is input to the light reception quantity check section 10 and is stored in the memory 12 for each of the color components R, G, and B of the light received at the light reception element 2. The memory 12 is provided with an area 12*a* for storing the upper limit values of the light reception quantities of the color components and the lower limit value of the total light reception quantity. The upper limit values and the lower limit value are preset in the area 12*a*. The lower limit value can be set as desired, but normally the light quantity required for color discrimination is set as the lower limit value.

At the stage where the light reception quantities of the color components are input in a way, the light reception quantity check section 10 compares the light reception quantities of the color components with the upper limit values set in the area 12*a* of the memory 12, finds the sum total (R+G+B=M) of the light reception quantities of the color components, and compares the found sum total M of the light reception quantities with the lower limit value set in the area 12*a* of the memory 12.

If the light reception quantity of one color component exceeds the corresponding upper limit value, the light reception quantity check section 10 judges that the light quantity is too large, and outputs a signal responsive to the excess of the light quantity to the display section 14; if the sum total M does not reach the lower limit value, the light reception quantity check section 10 judges that the light quantity is too small, and outputs a signal responsive to the shortage of the Light quantity to the display section 14. When the signal output from the light reception quantity check section 10 is input, if the signal exceeds the upper limit value, the display section 14 displays a character string or a symbol corresponding to the signal on the monitor section 15 made up of an LCD, etc., in the form of uuu, for example.

If the signal does not reach the lower limit value, the display section 14 displays a character string or a symbol corresponding to the signal on the monitor section 15 in the form of nnn, for example, different from the character string or the symbol displayed when the upper limit value is exceeded.

To set the reference values of the sum total of the light reception quantities and the light reception quantity of each of the color components R, G, and B for a detection object, the color discrimination system is preset to one setting mode (shown as tuning in FIGS. 2 to 5) by operating a switch, etc., (not shown), then light of the light source 1 is emitted to the detection object and the light reflected from the detection object or the light penetrating the detection object is received at the light reception element 2 for each of light wavelengths. The light reception quantity for each wavelength received at the light reception element 2 is sent to the operation section 9. Whenever the light quantities of the color components are input in a way, namely, whenever the light reception quantities are sampled, the operation section 9 finds the sum total of the light reception quantities of the wavelengths and the ratios of the light reception quantities of the wavelengths to the sum total.

The following is performed based on the light reception quantity of each wavelength, the sum total of the light reception quantities of the wavelengths, and the ratios of the light reception quantities of the wavelengths to the sum total thus found for the detection object: (The detection object may be a sample or a measurement target.)

Setting mode 1: To set the color discrimination system to the optimum sensitivity as shown in FIG. 2, the detection object is placed in a detection area (light emission spot) and is sampled. This is repeated during the setting mode and at the setting mode termination time, the reference values are in the range in which all ratios of the light reception quantities of the color components provided by sampling to the sum total can be detected, namely, in the range of the maximum value to the minimum value of the sum total of the light reception quantities of the wavelengths and the light reception quantities of the wavelengths to the sum total. The range may be a range in which not only the ratios, but also both the ratios and the sum total of the light reception quantities of the color components or the light reception quantities of the color components can be detected. The reference values can be thus set for enabling detection in a state in which the effects of the distance variation of the measurement target 6, disturbance light, and noise are excluded at the measurement time.

For example, to detect a workpiece having the only one color, if the reference values are set with the workpiece as the detection object, fluctuations of detection data are caused by disturbance light of a fluorescent lamp, etc., although the only one color is set. The optimum reference values close to the actual detection state considering also the fluctuations can be set. To execute detection based only on the ratios, large allowance can be provided for change in the light quantity from the detection object. This means that the workpiece can be detected regardless of the distance variation of the workpiece relative to the color discrimination system. Further, if the light quantity is set as the reference value like the ratio, severer detection can be executed than that with the above-described reference values. This means that light reception quantity variation caused due to the distance, etc., can also be detected in addition to color variation.

The reference value is considered to have one constant width. To calculate how much the value at the actual measurement time shifts from the true value of the detected substance when the reference value is set, the following means is available: When the average of the maximum value and the minimum value for each wavelength provided as described above is set as the reference value, it is adopted as the true value of the detected substance and the value at the actual measurement time is also found as described above. The difference between the values is calculated and how much the value at the actual measurement time shifts from the true value of the detected substance when the reference value is set can be indicated by the found difference as a numeric value. Likewise, the sum total of the light reception quantities of the color components can also be added as the calculation reference.

Setting mode 2: To set the color discrimination system to a detection limit, as shown in FIG. 3, the detection object is placed in the entire detection area, namely, in the range of the light emission spot and is sampled, and the sum total of the light reception quantities of the wavelengths and the ratios of the light reception quantities of the wavelengths to the sum total are found and are stored in the memory 11. Then, for example, the detection object is moved for placing a part of the detection object out of the detection area (placing at any desired output position), and is sampled. The sum total of the light reception quantities of the wavelengths and the ratios of the light reception quantities of the wavelengths to the sum total at this time are found and the reference values are set in the range of the ratios of the light reception quantities of the wavelengths to the sum total previously stored in the memory 11 and those found at this time.

In this case, not only the ratios of the light reception quantities of the wavelengths to the sum total at two places, but also both the ratios of the light reception quantities of the wavelengths to the sum total and the sum totals of the light reception quantities of the color components at two places or the light reception quantities of the color components may be adopted.

If the measurement target 6 is detected when it moves and comes to a predetermined position in the detection area, or if a detection object with color variations, such as a workpiece on which a detection color mark (for example, a red mark) is printed when a background exists (light reception quantity is sufficient for detection), is detected, in print situation, any color other than the desired red, for example, a red mark having a touch of white was identified as different color and was unable to be detected formerly. However, such an object with color variations can also be detected and the reference value with which an object can be detected in the color to be detected can be set easily.

Setting mode 3: To cause the measurement target to pass through the detection area and recognize color when no background exists (light quantity required for color discrimination does not exist) in sampling, a value of the light reception quantity required for color discrimination is preset. Next, as shown in FIG. 4, the measurement target passing through the detection area is sampled and the sum total of the light quantities of the color components is found. If the sum total exceeds the value of the light reception quantity required for color discrimination (stipulated value in the figure), the ratios of the light reception quantities of the color components to the sum total are found and the found values are adopted as the recognized color.

For example, as a method of finding the recognized color, a method of finding an average of the maximum value and minimum value of the ratios sampled and operated can be used. A similar method to that in setting mode 1 is possible as a method of finding the reference value. The measurement target color can be recognized regardless of the passage speed in setting mode 3.

Setting mode 4: To cause two different colors to pass through the detection area and recognize either color in sampling, as shown in FIG. 5, the measurement target passing through the detection area is sampled. Next, the sum total of the light reception quantities of the color components is found and the ratios of the light reception quantities of the color components to the found sum total are found. This sequence is repeated in the setting mode. After the setting mode terminates, the ratio between the maximum value of the found ratios and the ratio of the light reception quantity of different color component when the maximum value is indicated is the recognized color.

Further, the sum total of the light reception quantity for each wavelength when the maximum value is indicated can be added to the judgement of the recognized color found based to the ratio. In this case, severer color recognition is executed. For example, as a method of finding the recognized color, a method of finding an average of the maximum value and minimum value of the ratios found sampled and operated can be used. A similar method to that in setting mode 1 is possible as a method of finding the reference value.

In the related art, when an attempt is made to sample the measurement target passing through the detection area and set the reference values used for detection, if the speed at which the measurement target passes through the detection area is too low, the color change point is set as the reference; if the speed is too high, the reference values cannot be obtained. In the setting mode 4, this problem is solved and the reference values with which two colors passing through the detection area can be accurately discriminated from each other regardless of the speed at which the workpiece passes through the detection area.

In the setting modes, selection is made for each color component and separate setting may be executed. In the embodiment, the light reception quantity of each color component, the sum total of the light reception quantities of the color components, and the ratios of the light reception quantities of the color components to the sum total sent from the operation section 9 are displayed on the monitor section 15, and the maximum values and the minimum values of the light reception quantity of each color component, the sum total of the light reception quantities of the color components, and the ratios of the light reception quantities of the color components to the sum total can be set as desired by operating a switch (not shown), so that the reference values can be set finely while the values are checked on the monitor display.

That is, the light reception quantity for each wavelength for the detection object is sampled, the sum total of the light reception quantities of the wavelengths and the ratios of the light reception quantities of the wavelengths to the sum total or the light reception quantity for each wavelength are displayed, and the reference values of the sum total of the light reception quantities of the wavelengths and the ratios of the light reception quantities of the wavelengths to the sum total can be set while the display is seen.

For example, as detection conditions, poor discrimination is applied to change in R, for example, of the color components of the detected substance and strict discrimination is applied to color components of B and G. That is, discrete display is produced for the R color component and the range of the upper and lower limit values of the reference value is widened, next discrete display is produced for the G and B color components and the range of the upper and lower limit values of the reference value is narrowed for each of the G and B color components, whereby the reference values can be set for providing higher discrimination capability.

In the embodiment, the light source uses the three light emission elements for emitting R light, G light, and B light. However, any two of the three light emission elements may be used or halogen lamp, etc., maybe used. A plurality of light reception elements may be provided in a one-to-one correspondence with the colors and the light wavelengths are not limited to R, G, and B light wavelengths.

As described above, according to the invention, the reference values compared with the sum total of the light reception quantities and the ratios of the light reception quantities of the wavelengths to the sum total obtained from the measurement target can be easily set to the optimum values responsive to the detection state and the detection environment and the stable detection result with high discrimination accuracy is provided. The effect of the measurement environment, for example, disturbance light is small and color discrimination in change in the measurement target, for example, of the moving measurement target and color discrimination between two colors of the moving measurement target are enabled. Therefore, the color discrimination system which is not only easy to handle, but also high in reliability can be provided.

If display means for displaying the ratios of the light reception quantities, etc., is provided, the reference values can be set and the detection state at the detection time can be checked easily while they are checked on the display of the display means, so that the detection accuracy can be enhanced easily. Further, the color of the detection object can be known easily.

What is claimed is:

1. A color discrimination system, comprising:

light reception means for receiving light reflected from a measurement target or light penetrating the measurement target for each of a plurality of light wavelengths;

selecting means for determining a sum total of light reception quantities of the wavelengths and ratios of the light reception quantities of the wavelengths to the sum total, for selecting between a first operation mode using maximum and minimum values of only the ratios of the light reception quantities of the wavelengths to the sum total for a detection object as reference values and a second operation mode using maximum and minimum values of the ratios and the sum total of the light reception quantities of the wavelengths for the detection object as reference values, and for setting the reference values in accordance with the selected operation mode; and means for discriminating color of the measurement target and color of the detection object from each other based on the selected one of the first and second operation modes.

2. The color discrimination system as claimed in claim 1, wherein the plurality of light wavelengths includes a red wavelength, a green wavelength, and a blue wavelength.

3. The color discrimination system as claimed in claim 1, wherein the reference values define a range between the maximum and minimum values of the ratios of the light reception quantities of the wavelengths to the sum total in the first and second operation modes, and wherein the reference values additionally define a range between maximum and minimum values of the sum total of the light reception quantities of the wavelengths in the second operation mode.

4. The color discrimination system as claimed in claim 1, wherein the detection object and the measurement target are the same.

5. The color discrimination system as claimed in claim 1, wherein the detection object is a sample.

6. A color discrimination system, comprising:

light reception means for receiving light reflected from a measurement target or light penetrating the measurement target for each of a plurality of light wavelengths;

operation means for determining a sum total of light reception quantities of the wavelengths and ratios of the light reception quantities of the wavelengths to the sum total based on the light reception quantities received by the light reception means;

reference value setting means for setting operational result of the operation means based on sampling results of the light reception quantities received by the light reception means at two points of a detection object different in color as reference values for colors of the detection object; and color discrimination means for discriminating a color of the measurement target and color of the detection object from each other by comparing the sum total and/or the ratios found by the operation means based on the light reception quantities of the measurement target with the reference values for the detection object set by the reference value setting means.

7. The color discrimination system as claimed in claim 6, wherein the reference values are set by the reference value setting means in a range of the ratios of the light reception quantities of the wavelengths to the sum total at the two points and/or in a range of the light reception quantities of the wavelengths at the two points found by sampling based on the operational results of the operation means when the light reception quantities of the wavelengths at the two points of the detection object are sampled.

8. The discrimination system as claimed in claim 6, further comprising means for selecting between a first mode of color discrimination and a second mode of color discrimination, the first mode discriminating color by comparing the reference values with only the ratios and the second mode discriminating color by comparing the reference values with the sum total and the ratios.

9. The color discrimination system as claimed in claim 6, wherein the plurality of light wavelengths includes a red wavelength, a green wavelength, and a blue wavelength.

10. The color discrimination system as claimed in claim 6, wherein the reference values define a range between the maximum and minimum values of the ratios of the light reception quantities of the wavelengths to the sum total in the first and second operation modes, and wherein the reference values additionally define a range between maximum and minimum values of the sum total of the light reception quantities of the wavelengths in the second operation mode.

11. A color discrimination system, comprising:

light reception means for receiving light reflected from a measurement target or light penetrating the measurement target for each of a plurality of light wavelengths;

operating means for determining a sum total of light reception quantities of the wavelengths and ratios of the light reception quantities of the wavelengths to the sum total based on the light reception quantities of the wavelengths received by the light reception means;

comparison means for comparing the sum total which is determined by the operational result of said operating means when the light reception quantities of the wavelengths of a detection object are sampled with a preset value of a light reception quantity required for color discrimination; and adopting means for adopting the ratios determined by the operating means when the sum total of the light reception quantities exceeds the preset value of a light reception quantity required for color discrimination by the comparison means as a recognition color for color discrimination used as the basis for setting reference values for a color of the detection object.

12. A color discrimination system, comprising:

light reception means for receiving light reflected from a measurement target or light penetrating the measurement target for each of a plurality of light wavelengths;

operation means for determining a sum total of light reception quantities of the wavelengths and ratios of the light reception quantities of the wavelengths to the sum total based on the light reception quantities of the wavelengths received by the light reception means; and adopting means for adopting a maximum value of the ratios of the light reception quantities of the wavelengths which are operational results of the operation means when the light reception quantities of the wavelength at a plurality of points of a detection object are sampled, and another ratio when the maximum value is indicated or the sum total of the light reception quantities of the wavelengths when the maximum value is indicated as well as the ratio as a recognition color for color discrimination used as the basis for setting reference values for colors of the detection object.

13. A color discrimination system, comprising:

light reception means for receiving light reflected from a measurement target or light penetrating the measurement target for each of a plurality of light wavelengths;

operation means for determining a sum total of light reception quantities of the wavelengths and ratios of the light reception quantities of the wavelengths to the sum total based on the light reception quantities of the wavelengths received by the light reception means;

reference value setting means for setting the sum total of the light reception quantities of the wavelengths and each of the ratios and/or each of the light reception quantities of the wavelengths found by the operation means as reference values for colors of a detection object when the light reception quantities of the wavelengths are sampled;

display means for displaying the sum total of the light reception quantities of the wavelengths and each of the ratios of the light reception quantities of the wavelengths to the sum total found by the operation means and/or each of the light reception quantities of the wavelength found by the operation means; and color discrimination means for discriminating color of the measurement target and color of the detection object from each other by comparing the sum total and/or each of the ratios found by the operation means based on the light reception qualities of the measurement target with the reference values for the detection object set by the reference value setting means.

14. A system for discriminating the color of a target, comprising:

a light source for emitting light of a plurality of components;

a light reception element for receiving the emitted light from the light source after an amount of light is either reflected by or transmitted through the target, the light reception element providing a plurality of signals each corresponding to an amount of a respective component received;

an operation section to calculate a sum total of the amounts of the respective components received and to calculate ratios of each amount of the respective components to the sum total of the amounts, wherein the color of the target is discriminated on the basis of the sum total and the ratios as compared with minimum and maximum reference values, the maximum and minimum reference values being determined from sampling results of light received from measurements of a reference object.

15. The system for discriminating color as claimed in claim 14, further including means for selecting between a first operation mode using maximum and minimum values of only the ratios as reference values and a second operation mode using maximum and minimum values of the ratios and the sum totals as reference values.

16. The system for color discrimination as claimed in claim 15, wherein the reference values define a range between the maximum and minimum values of the ratios of the light reception quantities of the wavelengths to the sum total in the first and second operation modes, and wherein the reference values additionally define a range between maximum and minimum values of the sum total of the light reception quantities of the wavelengths in the second operation mode.

17. The system for color discrimination as claimed in claim 14, wherein the plurality of components includes a red wavelength, a green wavelength, and a blue wavelength.

18. A method for discriminating a color of a target, comprising the steps of:

emitting a light having a plurality of components to the target;

receiving an amount of light reflected by or transmitted through the target for each of the components;

calculating a sum total of the light amounts of each component received and calculating ratios of such of the light amounts received to the sum total;

comparing the sum total and the ratios with minimum and maximum reference values corresponding to the sum total and the ratios, the maximum and minimum reference values being determined from sampling results of light received from measurements of a reference object; and discriminating color of the measurement target and color of the detection object from each other on the basis of the comparison.

19. The method for discriminating color as claimed in claim 18, further including a step of selecting between a first operation mode using maximum and minimum values of only the ratios as reference values and a second operation mode using maximum and minimum values of the ratios and the sum totals as reference values.

20. The method for color discrimination as claimed in claim 19, wherein the reference values define a range between the maximum and minimum values of the ratios of the light reception quantities of the wavelengths to the sum total in the first and second operation modes, and wherein the reference values additionally define a range between maximum and minimum values of the sum total of the light reception quantities of the wavelengths in the second operation mode.

21. The method for color discrimination as claimed in claim 18, wherein the plurality of components includes a red wavelength, a green wavelength, and a blue wavelength.

22. The color discrimination system, comprising:

light reception means for receiving light reflected from an object or light penetrating the object for each of a plurality of light wavelengths;

selecting means for determining a sum total of light reception quantities of the wavelengths and ratios of the light reception quantities of the wavelengths to the sum total, for selecting between a first operation mode using maximum and minimum values of only the ratios as reference values and a second operation mode using maximum and minimum values of the ratios and the sum total as reference values, and for setting the reference values in accordance with the selected operation mode; and means for discriminating color of the object based on the selected one of the first and second operation modes.

* * * * *